US012628053B2

(12) United States Patent
Kordybach et al.

(10) Patent No.: US 12,628,053 B2
(45) Date of Patent: May 12, 2026

(54) METHOD AND APPARATUS FOR CONDITIONAL HANDOVER

(71) Applicant: Nokia Technologies Oy, Espoo (FI)

(72) Inventors: Krzysztof Kordybach, Wroclaw (PL); Srinivasan Selvaganapathy, Bangalore (IN); Ahmad Awada, Munich (DE); Subramanya Chandrashekar, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 312 days.

(21) Appl. No.: 18/558,010

(22) PCT Filed: Mar. 17, 2022

(86) PCT No.: PCT/EP2022/056981
§ 371 (c)(1),
(2) Date: Oct. 30, 2023

(87) PCT Pub. No.: WO2022/233488
PCT Pub. Date: Nov. 10, 2022

(65) Prior Publication Data
US 2024/0251305 A1 Jul. 25, 2024

(30) Foreign Application Priority Data
May 6, 2021 (IN) .............................. 202141020659

(51) Int. Cl.
*H04W 36/00* (2009.01)
*H04W 36/36* (2009.01)
(52) U.S. Cl.
CPC ... *H04W 36/0061* (2013.01); *H04W 36/0069* (2018.08); *H04W 36/00835* (2018.08); *H04W 36/362* (2023.05)

(58) Field of Classification Search
CPC . H04W 36/00; H04W 36/36; H04W 36/0061; H04W 36/0069; H04W 36/00835; H04W 36/362
See application file for complete search history.

(56) References Cited

U.S. PATENT DOCUMENTS 12,004,032 B2 * 6/2024 Kumar ................ H04W 36/305
12,137,363 B2 * 11/2024 Agarwal ........... H04W 72/0453
(Continued)

FOREIGN PATENT DOCUMENTS

WO 2019/160281 A1 8/2019
WO 2019/245329 A1 12/2019
(Continued)

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 16)", 3GPP TS 36.423, V16.4.0, Jan. 2021, pp. 1-500.
(Continued)

*Primary Examiner* — Hai V Nguyen
(74) *Attorney, Agent, or Firm* — Nokia Technologies Oy

(57) ABSTRACT

An apparatus comprising means for receiving requests from a plurality of master nodes to be included added as a secondary node into as part of a conditional handover process for a user equipment; means for obtaining, from each of said requests, an identification of the user equipment involved in the conditional handover process; and means for determining, based on said identifications of the user equipment, that a plurality of said requests concern the same user equipment.

18 Claims, 8 Drawing Sheets

(56) References Cited

U.S. PATENT DOCUMENTS

| | | | | |
|---|---|---|---|---|
| 12,267,732 | B2 * | 4/2025 | Teyeb ................... | H04W 76/27 |
| 12,418,840 | B2 * | 9/2025 | Zhang ................. | H04W 36/362 |
| 2020/0413312 | A1 | 12/2020 | Han et al. | |
| 2022/0167235 | A1 * | 5/2022 | Geng ................ | H04W 36/0083 |
| 2022/0295366 | A1 | 9/2022 | Teyeb et al. | |
| 2023/0007542 | A1 * | 1/2023 | Teyeb ................... | H04W 76/27 |
| 2023/0059448 | A1 * | 2/2023 | Mattam ............. | H04W 74/0841 |
| 2023/0171652 | A1 * | 6/2023 | Zhang ................. | H04W 36/362 370/331 |
| 2023/0189095 | A1 * | 6/2023 | Da Silva ......... | H04W 36/00837 455/437 |
| 2023/0239949 | A1 * | 7/2023 | Orsino .................. | H04W 76/19 370/329 |
| 2025/0071631 | A1 * | 2/2025 | Gürsu ............... | H04W 36/0064 |
| 2025/0380201 | A1 * | 12/2025 | Karabulut ......... | H04W 36/0069 |

FOREIGN PATENT DOCUMENTS

| | | | | | |
|---|---|---|---|---|---|
| WO | 2020/065126 | A2 | 4/2020 | | |
| WO | 2020/128848 | A1 | 6/2020 | | |
| WO | 2020/197469 | A1 | 10/2020 | | |
| WO | 2020/218863 | A1 | 10/2020 | | |
| WO | WO-2021015659 | A1 * | 1/2021 | ............ | H04W 76/30 |
| WO | WO-2021027896 | A1 * | 2/2021 | ............ | H04W 36/00 |
| WO | WO-2023213390 | A1 * | 11/2023 | .......... | H04W 36/362 |
| WO | WO-2024022654 | A1 * | 2/2024 | ...... | H04W 36/00838 |

OTHER PUBLICATIONS

"3rd Generation Partnership Project; Technical Specification Group Radio Access Network; NG-RAN; XN application protocol (XnAP) (Release 16)", 3GPP TS 38.423, V16.4.0, Jan. 2021, pp. 1-457.

"3rd Generation Partnership Project; Technical Specification Group Radio Access Network; NR; NR and NG-RAN Overall Description; Stage 2 (Release 16)", 3GPP TS 38.300, V16.4.0, Dec. 2020, pp. 1-149.

"3rd Generation Partnership Project, Technical Specification Group Radio Access Network; Evolved Universal Terrestrial Radio Access (E-UTRA); Radio Resource Control (RRC); Protocol specification (Release 16)", 3GPP TS 36.331, V16.3.0, Dec. 2020, pp. 1-1084.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"3rd Generation Partnership Project; Technical Specification Group Radio Access Network; NG-RAN; Architecture description (Release 16)", 3GPP TS 38.401, V16.4.0, Jan. 2021, pp. 1-78.

"Msc-generator", Sourceforge, Retrieved on Nov. 25, 2023, Webpage available at : https://sourceforge.net/projects/msc-generator/.

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.4.0, Dec. 2020, pp. 1-84.

International Search Report and Written Opinion received for corresponding Patent Cooperation Treaty Application No. PCT/EP2022/056981, dated Jun. 24, 2022, 14 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.5.0, Mar. 2021, pp. 1-391.

Office action received for corresponding European Patent Application No. 22716359.9, dated Feb. 14, 2024, 8 pages.

* cited by examiner

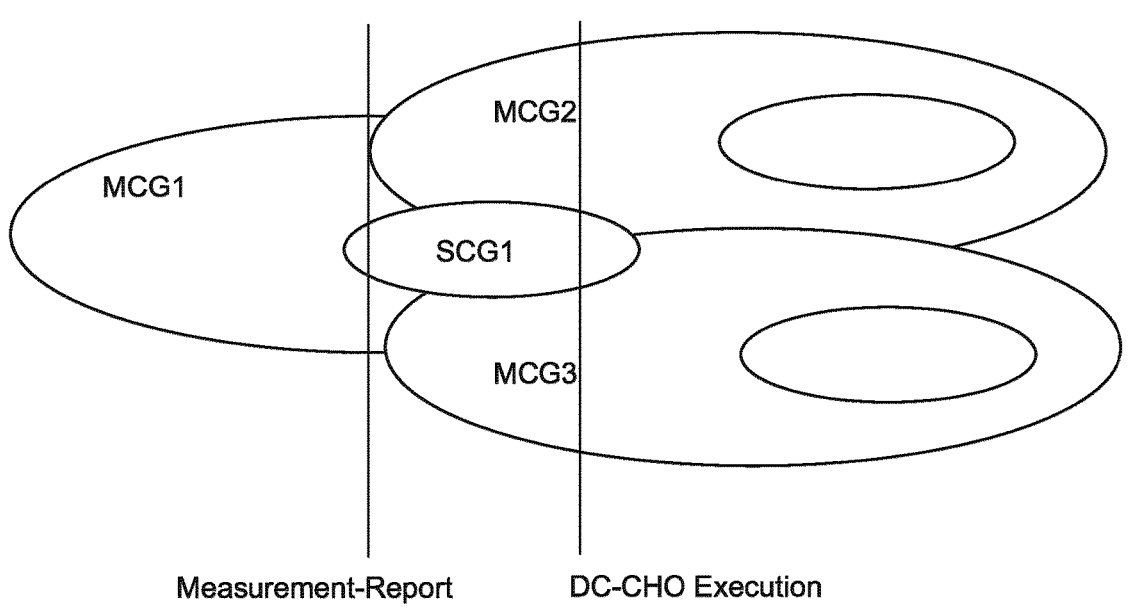

Measurement-Report       DC-CHO Execution

FIG. 5

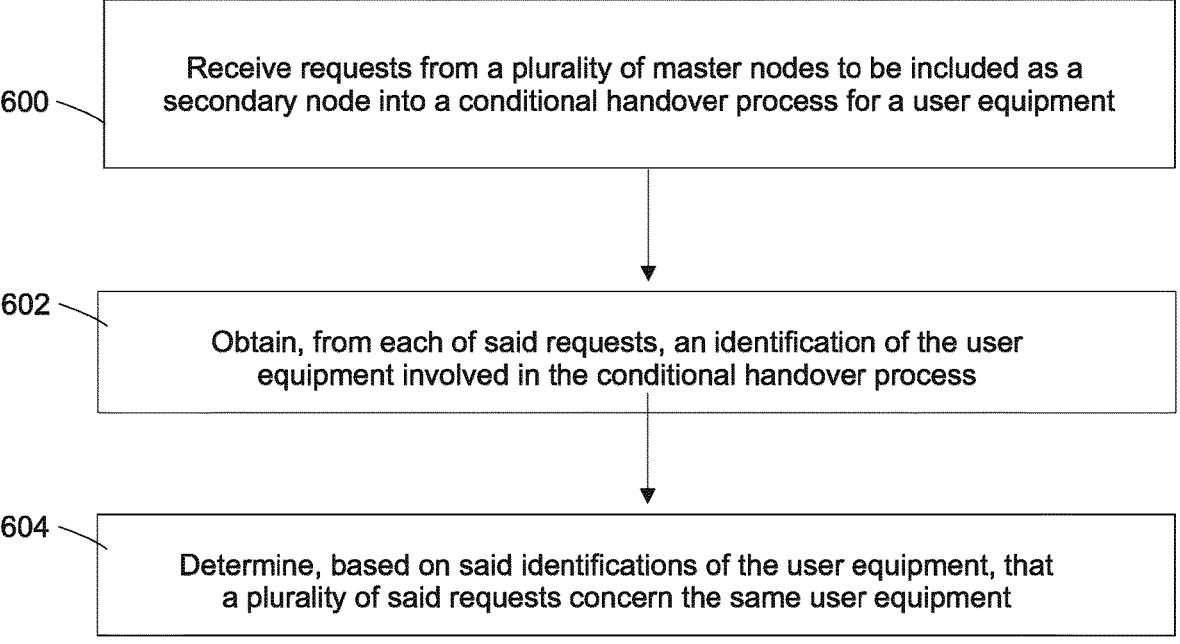

600 — Receive requests from a plurality of master nodes to be included as a secondary node into a conditional handover process for a user equipment 602 — Obtain, from each of said requests, an identification of the user equipment involved in the conditional handover process 604 — Determine, based on said identifications of the user equipment, that a plurality of said requests concern the same user equipment

FIG. 6

METHOD AND APPARATUS FOR CONDITIONAL HANDOVER

RELATED APPLICATION

This application was originally filed as a Patent Cooperation Treaty Application No. PCT/EP2022/056981, filed on Mar. 17, 2022, which claims priority from Indian provisional application No. 202141020659 filed on May 6, 2021, both of which are hereby incorporated by reference in their entirety.

TECHNICAL FIELD

The present invention relates to handover methods.

BACKGROUND

A conditional handover (CHO) is a feature supported in LTE and in 5G NR. The CHO resembles in many aspects the previously known "ordinary" handover (HO), i.e. the legacy HO. As a main difference to the legacy HO, in the CHO the user equipment (UE) starts the preparations for handover to the target node only when an additional CHO execution condition is met. Another difference between the legacy HO and the CHO is the preparation of multiple target cells in the CHO. Thus, the CHO reserves more resources at target cells than a legacy HO while waiting for the execution.

In case of multiple preparations, each of the target Master Nodes (MNs) may prepare its own target Secondary Node (SN). Each target SN will therefore have to reserve the needed resources, too.

The CHO has also been specified for UEs configured with use of Dual Connectivity. Therein, the source MN node sends a handover request to a plurality of target MNs, which in turn select a target SN and prepares it as part of the CHO preparation. The handover request may concern a single UE; i.e. a handover request concerning one UE is sent to a plurality of target MNs, which in turn may select a common target SN for the CHO preparation.

However, while the target MNs are aware of each preparation that concerns the same UE and may therefore optimize the radio resource reservation accordingly, the target SN has no means identify the handover request concerning the same UE, and therefore the target SN has to carry out the radio resource reservation as if each of the handover requests were concerning a different UE.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising means for receiving requests from a plurality of master nodes to be added as a secondary node as part of a conditional handover process for a user equipment; means for obtaining, from each of said requests, an identification of the user equipment involved in the conditional handover process; and means for determining, based on said identifications of the user equipment, that a plurality of said requests concern the same user equipment.

An apparatus according to a second aspect comprises at least one processor and at least one memory, said at least one memory stored with computer program code thereon, the at least one memory and the computer program code configured to, with the at least one processor, cause the apparatus at least to perform: receive requests from a plurality of master nodes to be added as a secondary node as part of a conditional handover process for a user equipment; obtain, from each of said requests, an identification of the user equipment involved in the conditional handover process; and determine, based on said identifications of the user equipment, that a plurality of said requests concern the same user equipment.

According to an embodiment, the identification of the user equipment is unique among said master nodes.

According to an embodiment, the identification of the user equipment is temporary such that its validity is dependent on a preparation time for the conditional handover process.

According to an embodiment, the apparatus comprises computer program code configured to cause the apparatus to perform: obtain the identification of the user equipment from an Addition Request received from a master node.

According to an embodiment, the identification of the user equipment comprises an identification of a secondary node to a current serving node of the user equipment included in the Addition Request.

According to an embodiment, the identification of the user equipment further comprises an identification of the current serving node of the user equipment included in the Addition Request.

According to an embodiment, the identification of the user equipment comprises an identification of the current serving node of the user equipment and the identification of the user equipment in the current serving node of the user equipment, both included in the Addition Request.

According to an embodiment, the identification of the user equipment comprises a random number, generated by the current serving node of the user equipment or the secondary node to a current serving node of the user equipment, included in the Addition Request.

According to an embodiment, the apparatus comprises computer program code configured to cause the apparatus to perform: generate a temporary identification for a Secondary Cell Group configuration; and include the temporary identification for the Secondary Cell Group configuration in acknowledgement messages to be sent to one or more of said plurality of master nodes.

According to an embodiment, the apparatus comprises computer program code configured to cause the apparatus to perform: obtain, from at least one of said master nodes, a request to release radio resources reserved for the user equipment by the apparatus in response to the master node receiving a conditional handover cancel request from the current serving node of the user equipment.

According to an embodiment, the conditional handover cancel request comprises the temporary identification for the Secondary Cell Group configuration.

A method according to a third aspect comprises receiving, by an access node, requests from a plurality of master nodes to be added as a secondary node as part of a conditional handover process for a user equipment; obtaining, from each of said requests, an identification of the user equipment involved in the conditional handover process; and determining, based on said identifications of the user equipment, that a plurality of said requests concern the same user equipment.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which:

FIG. 5 shows an example multiple target master nodes attempting to prepare the same access node as a target secondary node;

FIG. 6 shows a flow chart for a method for enhanced signalling in conditional handover according to an embodiment;

DETAILED DESCRIPTION OF SOME EXAMPLE EMBODIMENTS

The following describes in further detail suitable apparatus and possible mechanisms carrying out the operations for a conditional handover. While the following focuses on 5G networks, the embodiments as described further below are by no means limited to be implemented in said networks only, but they are applicable in any network supporting conditional handover.

Figure 1:
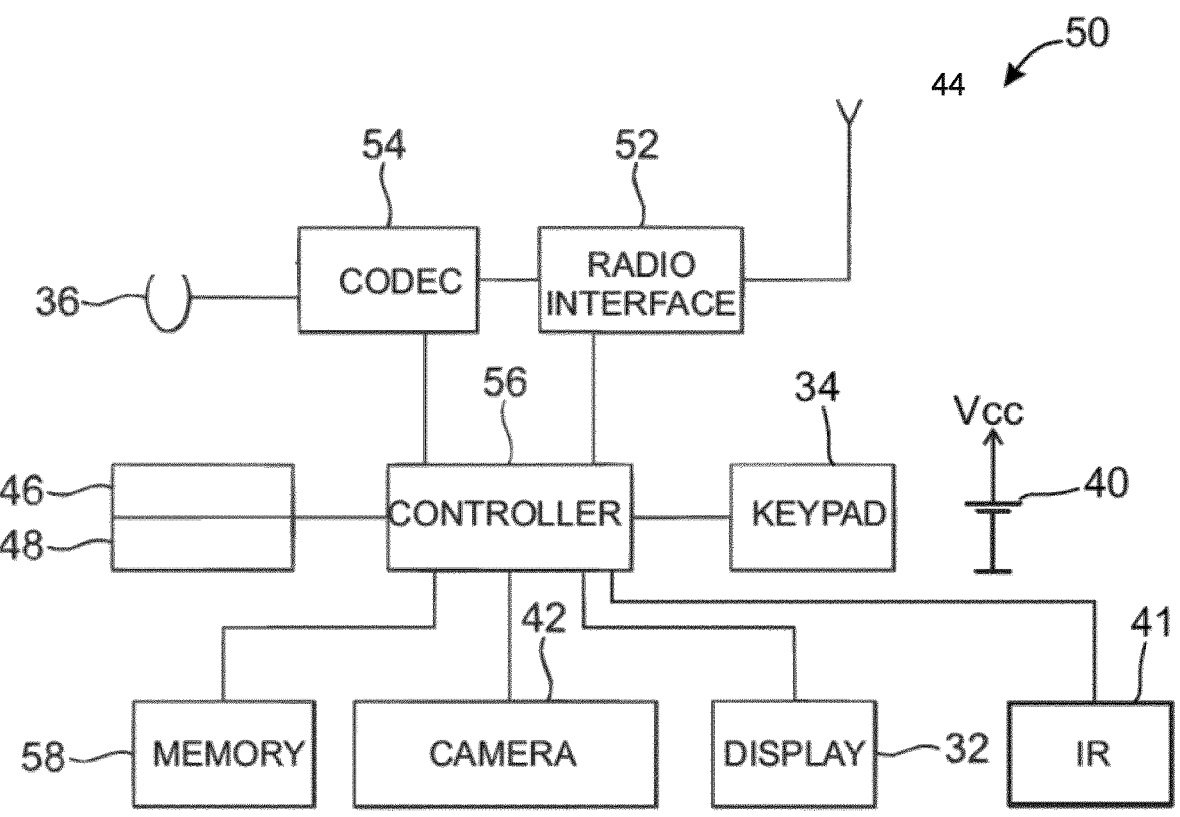
FIG. 1 shows a schematic block diagram of a user equipment apparatus for incorporating functionalities for implementing various embodiments.
Figure 2:
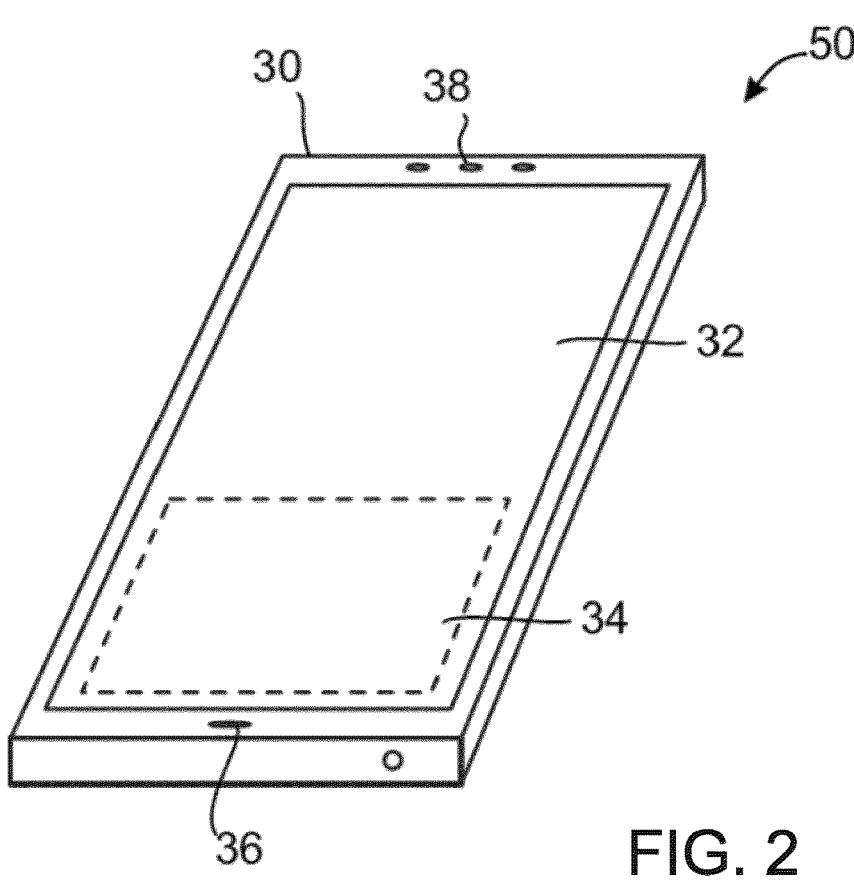
FIG. 2 shows schematically a layout of a user equipment apparatus according to an example embodiment.

In this regard, reference is first made to FIGS. 1 and 2, where FIG. 1 shows a schematic block diagram of an exemplary apparatus or electronic device 50, which may incorporate the arrangement according to the embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
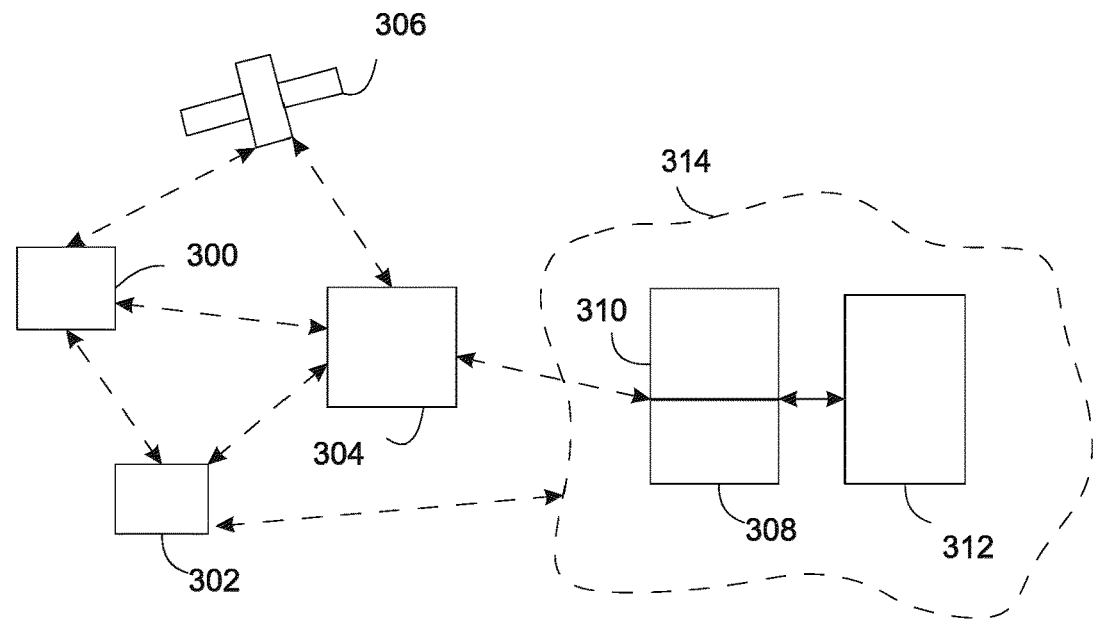
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g)NodeB) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node (such as Integrated Access and Backhaul (IAB) node), host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

In 5G NR, the User Plane Function (UPF) may be used to separate the control plane and the user plane functions. Therein, the Packet Gateway (PGW) control and user plane functions may be decoupled, whereby the data forwarding component (PGW-U) may be decentralized, while the PGW-related signaling (PGW-C) remains in the core. This allows packet processing and traffic aggregation to be performed closer to the network edge, increasing bandwidth efficiencies while reducing network.

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IOT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHZ, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IOT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto-or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states is controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ (Hybrid Automatic Repeat reQuest) feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

Figure 4:
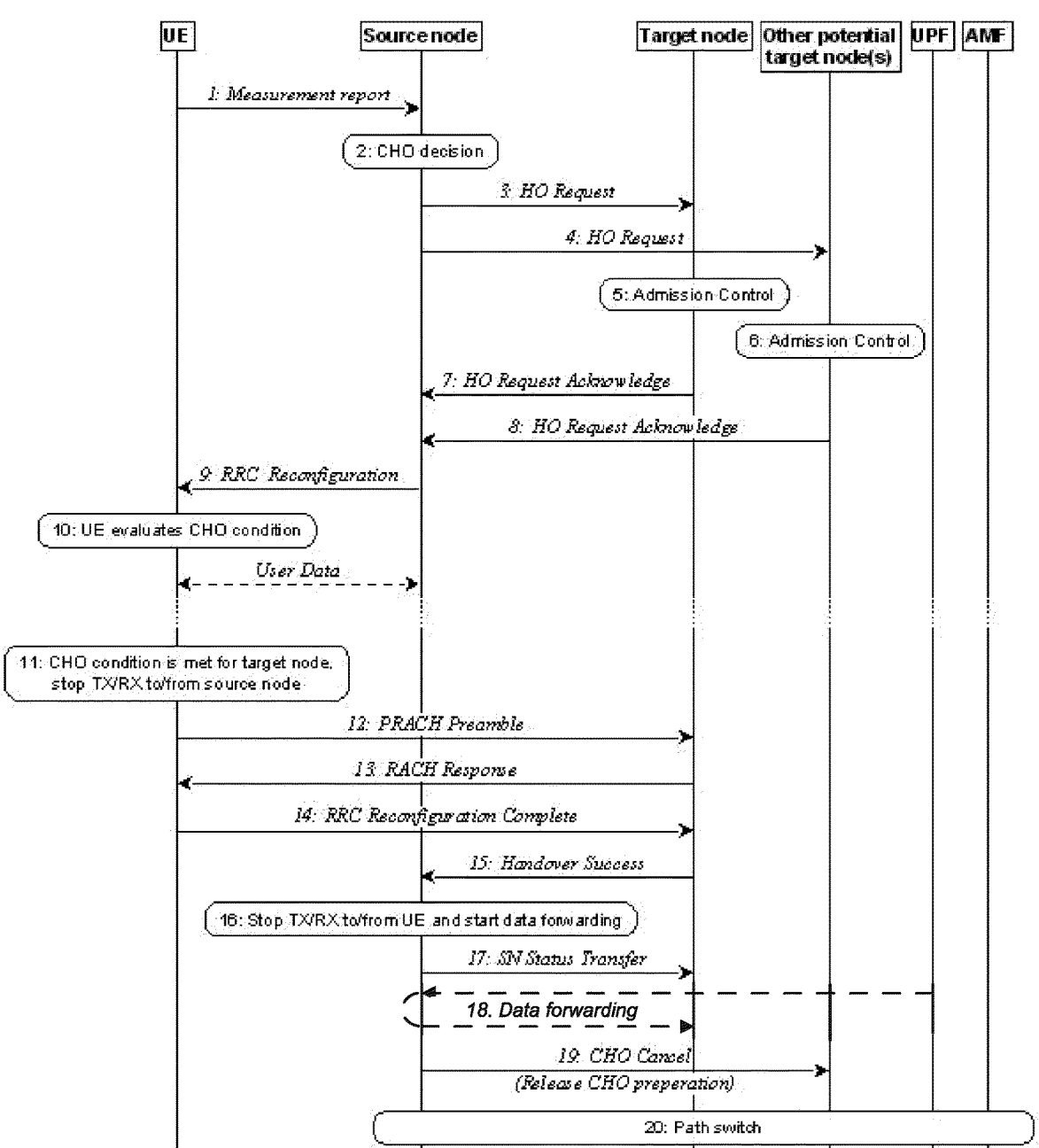
FIG. 4 shows a signalling diagram for a conditional handover process.

A conditional handover (CHO) is a feature supported in LTE and in 5G NR. The CHO resembles in many aspects the previously known "ordinary" handover (HO), i.e. the legacy HO. An exemplary signalling diagram of CHO is shown in FIG. 4. A configured event triggers the UE to send a measurement report to its current serving node e/gNB. In terms of the HO process, the currently serving node may be referred to as a source node. Based on this report, the source node typically prepares one or more candidate target nodes for the handover. The preparation includes a Handover Request sent to each target node and a Handover Request Acknowledge received from each target node. The source node then sends a handover command (including the RRC Reconfiguration message) to the UE. For the legacy HO, the UE would immediately handover to the target node by reconfiguring it as its new serving e/gNB node to complete the handover.

Instead, for the CHO, the UE will only access the target node once an additional CHO execution condition is fulfilled. The condition is configured, e.g. by the source cell during HO Command. Thus, the UE monitors whether the CHO execution condition is fulfilled, and meanwhile the user data may be transmitted between the UE and the source node. Only when the CHO execution condition is fulfilled, the UE starts the preparations for handover to the target node.

Dual Connectivity (DC) is a feature supported in LTE and in 5G NR enabling aggregation of two radio links at the PDCP (Packet Data Convergence Protocol) layer level. For resource aggregation, a UE in RRC_CONNECTED state is allocated two radio links from two different network nodes that may be connected via a non-ideal backhaul. The first node, Master Node (MN), serves as mobility and signaling anchor and the second node, Secondary Node (SN), provides additional local radio resources for UE. The two resource sets are called as Master Cell Group (MCG, associated with MN) and Secondary Cell Group (SCG, associated with SN). The MN can be either LTE eNB or NR gNB. The SN can be either LTE eNB or NR gNB. The MN and the SN can be the same node.

Dual Connectivity can improve user throughput and mobility robustness, since the users may be connected simultaneously to MCG and SCG, as well as improve load balancing between MCG and SCG resources.

The CHO has been specified for UEs configured with use of Dual Connectivity. Herein, the source MN node (controlling Primary Cell, PCell) sends a handover request to the target MN node (controlling target PCell) which in turn selects a secondary node (controlling target PSCell) and prepares it as part of the CHO preparation. When the CHO execution condition is met, the UE performs access to the target PCell and PSCell.

One of the main differences between the legacy HO and the CHO is the preparation of multiple target cells. In future, the CHO is expected to be used much more widely to make sure that the UE has a prepared target when the execution condition is met. This means that CHO reserves more resources at target cells than a legacy HO while waiting for the execution. 3GPP has enabled mechanism to allow the target node to optimise the allocation, because it may be aware of each preparation that concerns the same UE.

In case of multiple preparations, each of the target Master Nodes (MNs) may prepare its own target Secondary Node (SN). Each target SN will therefore have to reserve the needed resources, too.

Since each of the target MNs receives the same measurements, it may well happen that they decide to prepare the same SN (especially if the cloud deployment makes the covered area of the SN wide). If this SN is the same as used in the source MN, the SN receives the UE ID allocated for the communication with the source MN and thus it may identify the preparations as related to the already known UE.

In another scenario illustrated in FIG. 5, a source SN may have single connectivity at the time of handover but includes potential measurements about suitable SCG cells at the time of handover. In this case the target MNs of CHO may prepare DC configuration. But if the suitable SCG is in overlapping coverage of MCG, two MN will attempt to prepare same SCG (PSCell).

However, if the SN selected by the target nodes is different than the one used at the source (or the source has not used any SN), then it will not have the UE context yet. Because of that, the target MNs will not provide the UE context ID and the target SN will have to allocate resources for each conditional handover request separately. This complicates especially the situation of the SN: while the MN has the means to associate multiple preparation requests (to different PCells under the same target MN) with the same UE and optimize the radio resource reservation accordingly, the target SN has no means to carry out the same.

Therefore, it would be preferable to have the target SN with sufficient information for associating multiple preparation requests relating to the same UE so as to optimize the radio resource reservation.

In the following, an enhanced method for conditional handover will be described in more detail, in accordance with various embodiments.

The method is disclosed in the flow chart of FIG. 6 as reflecting the operation of an access node, such as an e/gNB, wherein the method comprises receiving (600), by an access node, requests from a plurality of master nodes to be included as a secondary node into a conditional handover process for a user equipment; obtaining (602), from each of said requests, an identification of the user equipment involved in the conditional handover process; and determining (604), based on said identifications of the user equipment, that a plurality of said requests concern the same user equipment.

Thus, in order to make the target SN aware that the preparation requests received from different MNs concern the same UE, the target SN shall be provided with an identification of the UE involved in the conditional handover process. The identification may be assigned e.g. by the source MN or the source SN, for example upon initiating the CHO process. The identification is shared with all potential target MNs, and therefore, upon receiving requests from a plurality of MNs to be included as a secondary node into a CHO process, the access node may immediately determine, based on the UE identifications included in the requests, if a plurality (i.e. two or more) of said requests concern the same UE. Accordingly, upon determining that multiple CHO preparation requests relate to the same UE, the access node may optimize its radio resource reservation when initiating its operation as a target SN.

According to an embodiment, the identification of the user equipment is unique among said master nodes.

Thus, when the source MN or the source SN assigns the identification to the UE, the identification will be shared with all potential target MNs. Therefore, all the target MN(s) shall be bound to use the same identification when dealing with any given target SN. In order to tell the difference of UEs associated with the requests coming from the MNs, as well as identify the requests relating to the same UE, the identification of the UE shall be unique among all target MNs involved in the CHO preparations.

According to an embodiment, the identification of the user equipment is temporary such that its validity is dependent on a preparation time for the conditional handover process.

Since the purpose of the identification of the UE is to facilitate the radio resource reservation process of an access node upon initiating its operation as a target SN in CHO process, only a temporary identification is needed for the UE. The validity time of the identification of the UE may be set e.g. as somewhat longer than the maximum CHO preparation time.

According to an embodiment, the identification of the user equipment is obtained from an Addition Request received from a master node. As a part of the Dual Connectivity handover process, the target MN sends an Addition Request to a potential target SN to notify it for the CHO preparations. Now the identification of the UE may be included in this existing request message sent from the target MN to the target SN.

According to an embodiment, the identification of the user equipment comprises an identification of a secondary node to a current serving node of the user equipment included in the Addition Request.

Figures 7, 8:
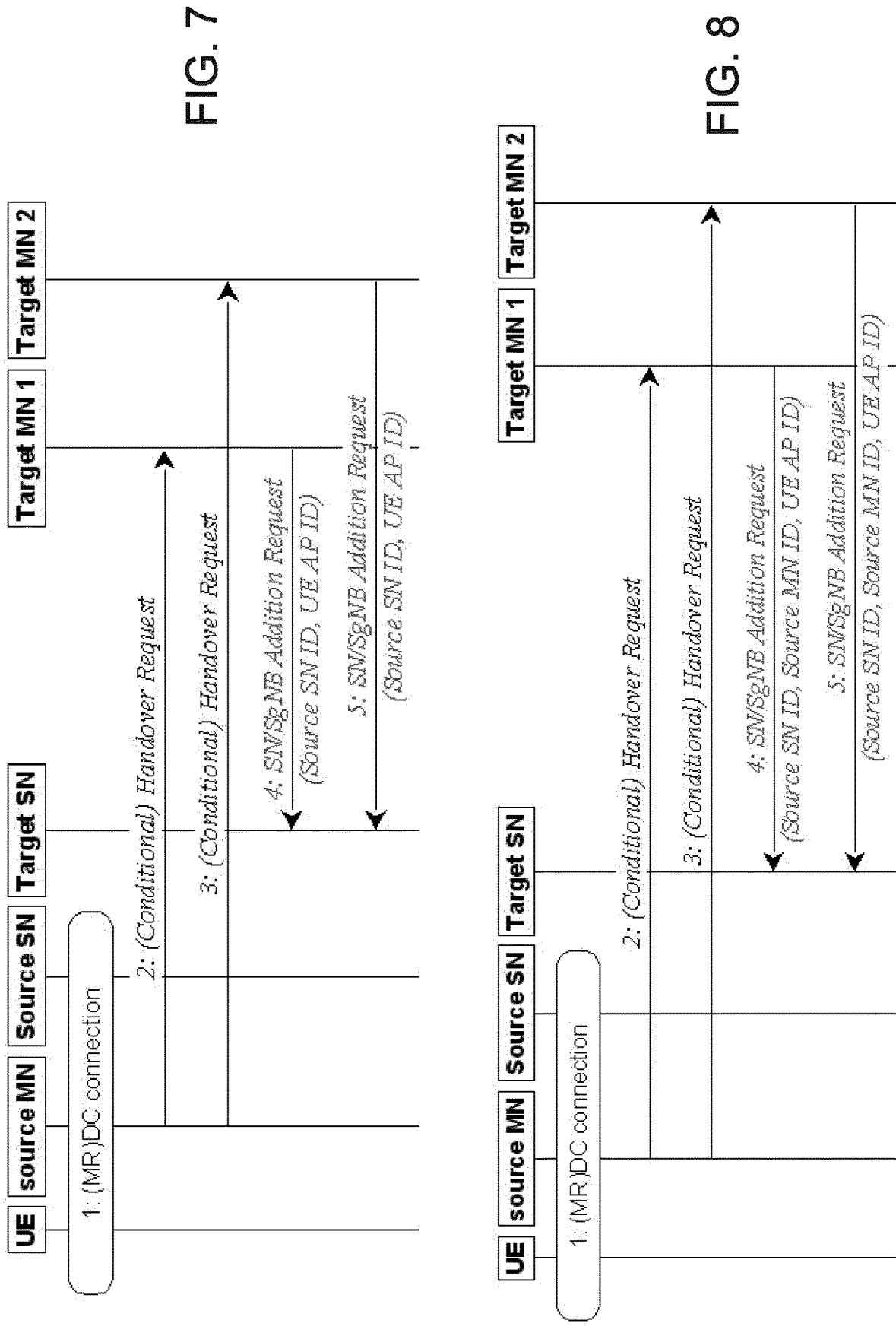
FIG. 7 shows an exemplified signalling chart for obtaining the identification of the user equipment according to an embodiment.
FIG. 8 shows an exemplified signalling chart for obtaining the identification of the user equipment according to another embodiment.

This embodiment is illustrated in the signalling diagram of FIG. 7. It is noted that FIG. 7 shows only the initial stages of the CHO preparation signalling. Based e.g. on the measurement report from the UE, the source MN sends Conditional Handover Requests to two potential target MNs, Target MN1 and Target MN2. Both potential target MNs, Target MN1 and Target MN2, send an Addition Request to the access node, i.e. Target SN.

The Addition Request includes a Xn UE AP ID, which uniquely identifies a logical connection associated to a UE over the Xn interface within an M-NG-RAN node (i.e. the source SN in this case) for dual connectivity, as defined in 3GPP 38.401 Release-16.

Now the Xn UE AP ID in the Addition Request is provided with an identification of a secondary node to a current serving node of the user equipment, i.e. the identification of current Source SN of the UE (Source SN ID), which enables to the Target SN to identify, together with the Xn UE AP ID, the associated UE uniquely.

According to an embodiment, the identification of the user equipment further comprises an identification of the current serving node of the user equipment included in the Addition Request.

Thus, in addition to the identification of a secondary node to a current serving node of the user equipment, i.e. Source SN ID, the Addition Request is provided with the identification of the current serving node of the user equipment, the identification of current Source MN of the UE (Source MN ID). This is illustrated in the signalling diagram of FIG. 8, which is otherwise similar to the signalling diagram of FIG. 7, but the Addition Request further includes a Source MN ID.

According to an embodiment, the identification of the user equipment comprises an identification of the current serving node of the user equipment and the identification of the user equipment in the current serving node of the user equipment, both included in the Addition Request.

Thus, if the source MN uses the same Xn UE AP Id across all the interfaces, then the identification of the user equipment comprises the source MN ID and the Xn UE AP ID allocated in the source MN ID, both included in the Addition Request. In other words, the Addition Request is provided with the identification of the current serving node of the user equipment, i.e. the source MN ID, and the Xn UE AP ID allocated in the current serving node of the user equipment.

According to an embodiment, the identification of the user equipment comprises a random number, generated by the current serving node of the user equipment or the secondary node to a current serving node of the user equipment, included in the Addition Request.

Thus, instead of the Source SN ID, and possibly Source MN ID, a random number may be assigned to the UE at the source MN or source SN. The random number as the UE ID may be passed to all prepared target MNs which would then include it in the Addition Request towards a selected target SN. If the target SN receives the same number from different MNs, it may assume it concerns the same UE.

Figure 9:
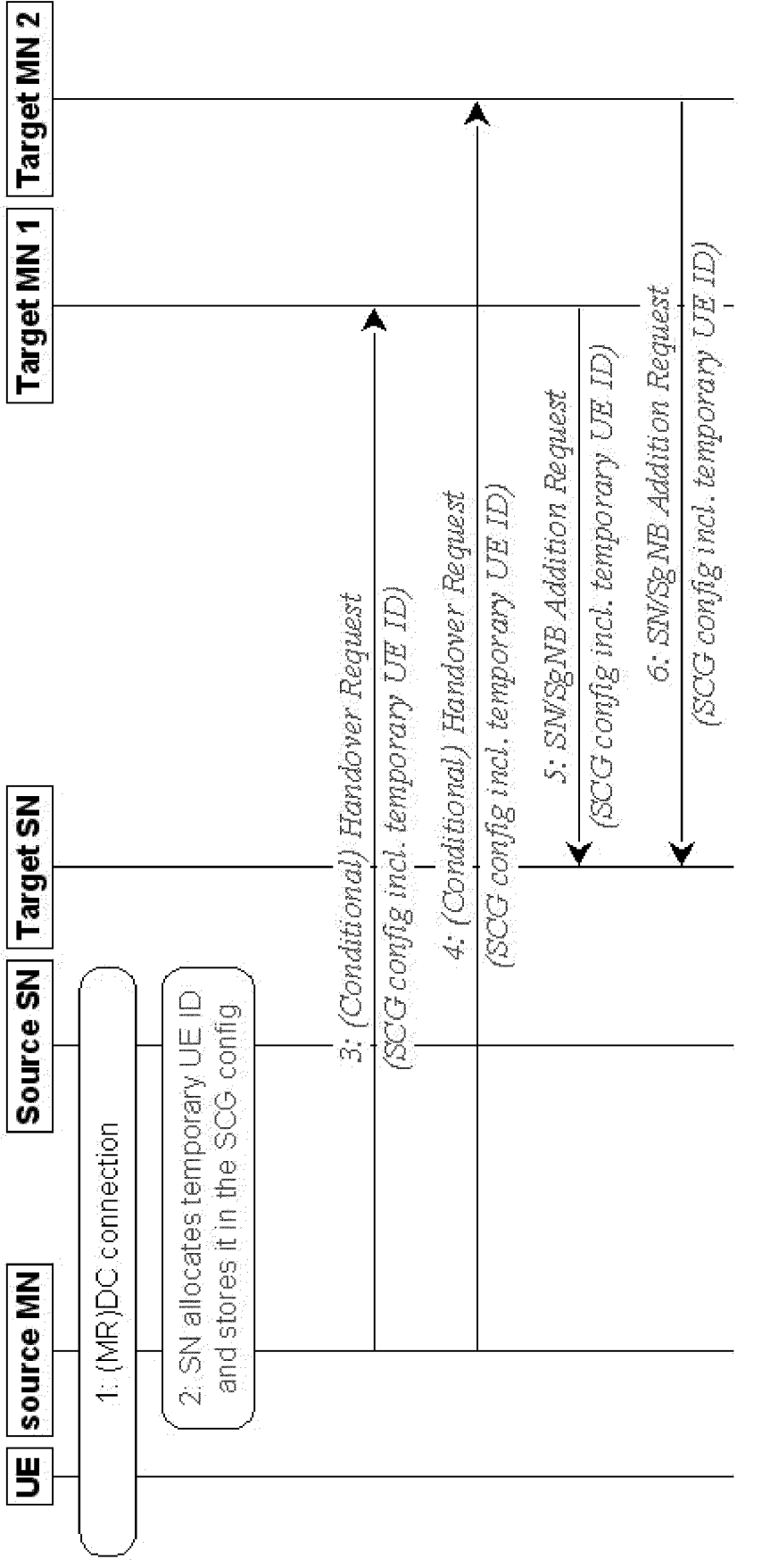
FIG. 9 shows an exemplified signalling chart for obtaining the identification of the user equipment according to yet another embodiment.

This is illustrated in the signalling diagram of FIG. 9, which is otherwise similar to the signalling diagrams of FIGS. 7 and 8, but both Conditional Handover Requests sent by the Source MN to the Target MNs and the Addition Requests sent by the Target MNs to the Target SN include an updated SCG configuration provided with the random number as the temporary UE ID.

It is noted that all the above solutions, as illustrated in FIGS. 7-9, lead to the situation where the target SN is able to identify requests coming from different target MNs but concerning the same UE.

According to an embodiment, the method comprises generating, by the access node, a temporary identification for a Secondary Cell Group configuration; and including the temporary identification for the Secondary Cell Group configuration in acknowledgement messages to be sent to one or more of said plurality of master nodes.

Figure 10:
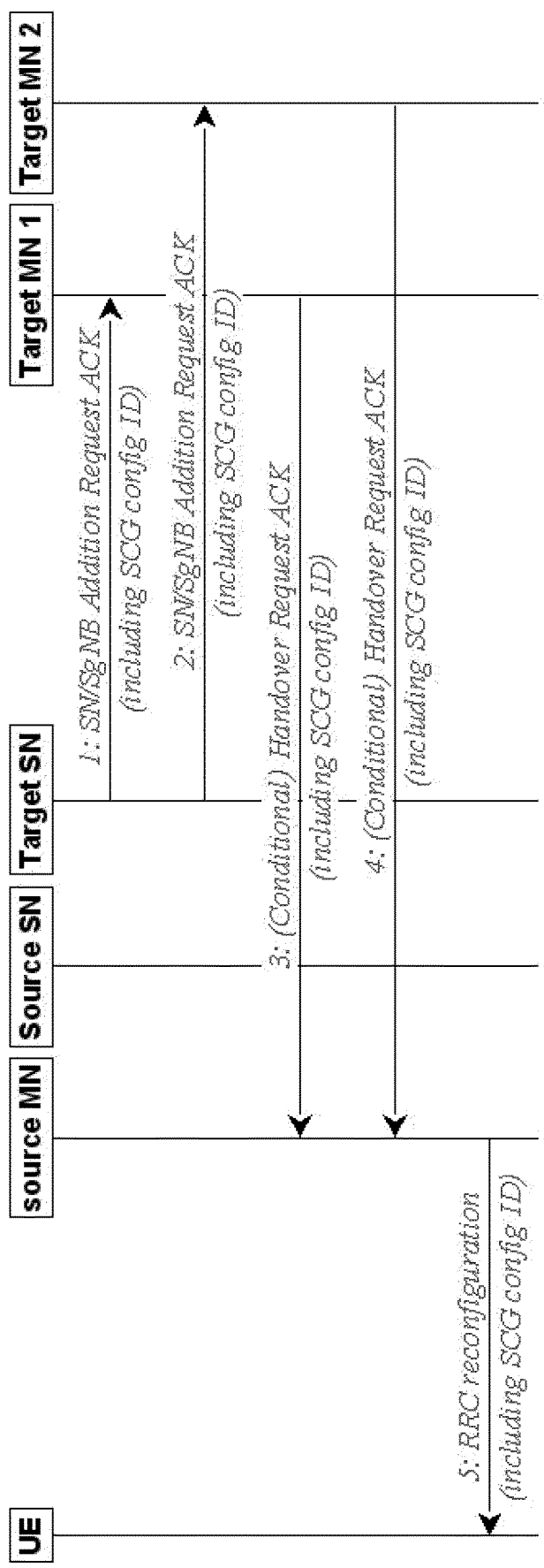
FIG. 10 shows an exemplified signalling chart for preparing the same user equipment towards a plurality of target master nodes according to an embodiment.

Since the target SN is now aware of requests concerning the same UE, it may further generate a second temporary identification, which may be referred to as SCG config ID, when it prepares the same UE towards multiple MNs. This is illustrated in the signalling diagram of FIG. 10. It is noted that the signalling diagram of FIG. 10 shows further steps for the signalling diagrams of any of the FIGS. 7-9. The target SN associates the SCG config ID as unique for every common SCG preparation and sends it to each of the potential Target MNs, e.g. in Addition Request Acknowledgment messages. The target MNs forward the SCG config ID to Source MN. Source MN may provide the parameter SCG config ID in the CHO configuration (i.e. RRC Reconfiguration message) to the UE.

The UE identifies the CHO configurations with the common SCG. The UE may use this information for storage optimization or preferring CHO recovery towards the target MN with same SCG after CHO failure.

According to an embodiment, the method comprises obtaining, from a master node, a request to release radio resources reserved for the user equipment by the access node in response to the master node receiving a conditional handover cancel request from the current serving node of the user equipment.

According to an embodiment, the conditional handover cancel request comprises the temporary identification for the Secondary Cell Group configuration.

Once the source MN is now aware of the SCG config ID (as provided from the target SN via the source MN to the UE in the above process), the source MN may utilize the SCG config ID in CHO Cancel signalling to the Target MNs in the case where the handover process is cancelled. Thus, the source MN may indicate to a (i.e. any) target MN to skip release of the radio resources reserved at the common target SN, i.e., it would be enough if only one of the prepared target MN sends a release request to the target SN. Such indication may be a part of the CHO Cancel message sent from the source MN to one target MN. The CHO Cancel sent to the target MN, which is expected to release the UE context, may also contain the SCG config ID, which will then be forwarded from the target MN in the release request to the target SN to indicate that all of the related resources are to be released.

The method and the embodiments related thereto may also be implemented in an apparatus implementing an access point or a base station of a radio access network, such as an eNB or a gNB. An apparatus, such as a gNB, according to an aspect comprises means for receiving requests from a plurality of master nodes to be included added as a secondary node into as part of a conditional handover process for a user equipment; means for obtaining, from each of said requests, an identification of the user equipment involved in the conditional handover process; and means for determining, based on said identifications of the user equipment, that a plurality of said requests concern the same user equipment.

According to an embodiment, the identification of the user equipment is unique among said master nodes.

According to an embodiment, the identification of the user equipment is temporary such that its validity is dependent on a preparation time for the conditional handover process.

According to an embodiment, the apparatus comprises means for obtaining the identification of the user equipment from an Addition Request received from a master node.

According to an embodiment, the identification of the user equipment comprises an identification of a secondary node to a current serving node of the user equipment included in the Addition Request.

According to an embodiment, the identification of the user equipment further comprises an identification of the current serving node of the user equipment included in the Addition Request.

According to an embodiment, the identification of the user equipment comprises a random number, generated by the current serving node of the user equipment or the secondary node to a current serving node of the user equipment, included in the Addition Request.

According to an embodiment, the apparatus comprises means for generating a temporary identification for a Secondary Cell Group configuration; and means for including the temporary identification for the Secondary Cell Group configuration in acknowledgement messages to be sent to one or more of said plurality of master nodes.

According to an embodiment, the apparatus comprises means for obtaining, from at least one of said master nodes, a request to release radio resources reserved for the user equipment by the apparatus in response to the master node receiving a conditional handover cancel request from the current serving node of the user equipment.

According to an embodiment, the conditional handover cancel request comprises the temporary identification for the Secondary Cell Group configuration.

An apparatus, such as an access point or a base station of a radio access network, e.g. an eNB or a gNB, according to a further aspect comprises at least one processor and at least one memory, said at least one memory stored with computer program code thereon, the at least one memory and the computer program code configured to, with the at least one processor, cause the apparatus at least to perform: receive requests from a plurality of master nodes to be added as a secondary node as part of a conditional handover process for a user equipment; obtain, from each of said requests, an identification of the user equipment involved in the conditional handover process; and determine, based on said identifications of the user equipment, that a plurality of said requests concern the same user equipment.

Figure 11:
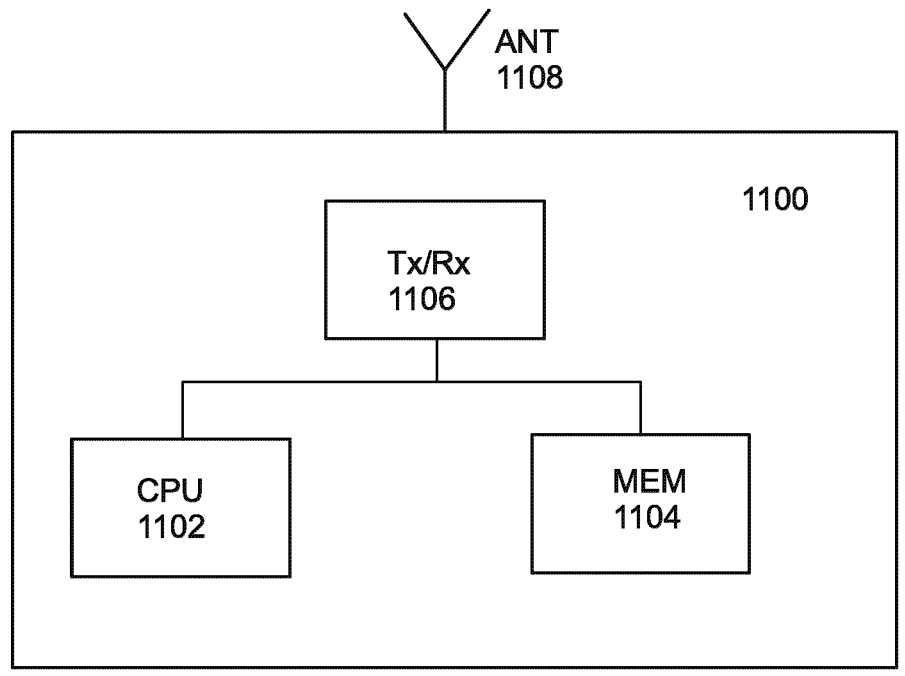
FIG. 11 shows a schematic block diagram of a network node apparatus according to an embodiment.

Such apparatuses may comprise e.g. the functional units disclosed in FIG. 11 showing a simplified block diagram of a network node, i.e. the apparatus, according to the aspects and the related embodiments. It is noted that while the above embodiments are mainly disclosed in connection with a target Secondary Node (SN), the structure and functional units as disclosed in FIG. 11 are equally applicable in network node, such as in a source MN, a source SN and a target MN, as disclosed above.

The network node 1100 may be a base station, an access point, an access node, a gNB, a evolved NodeB (eNB), a server, a host, or any other network entity that may communicate with the UE.

The apparatus may include at least one processor or control unit or module 1102. At least one memory 1104 may be provided in the apparatus. The memory may include computer program instructions or computer code contained therein. One or more transceivers 1106 may be provided, and the apparatus may also include an antenna 1108, Although only one antenna each is shown, many antennas and multiple antenna elements may be provided to the apparatus. Other configurations of the apparatus, for example, may be provided. For example, in addition to wireless communication, the network node may be additionally configured for wired communication with the UE, and in such a case antenna 1108 may illustrate any form of communication hardware, without being limited to merely an antenna.

Transceiver 1106 may be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

In certain embodiments, the apparatus may comprise at least one processor and at least one memory including computer program code. The at least one memory including computer program code can be configured to, with the at least one processor, cause the apparatus at least to perform any of the processes described herein.

Processors 1102 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). The at least one memory 1104 may independently be any suitable storage device, such as a non-transitory computer-readable medium. A hard disk drive (HDD), random access memory (RAM), flash memory, or other suitable memory may be used. The memory may be combined on a single integrated circuit as the processor, or it may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network node 1100, to perform any of the processes described above. Therefore, in certain embodiments, a non-transitory computer-readable medium may be encoded with instructions or one or more computer program (such as added or updated software routine, applet or macro) that, when executed in hardware, may perform a process such as one of the processes described herein. In other embodiments, a computer program product may encode instructions for performing any of the processes described above, or a computer program product embodied in a non-transitory computer-readable medium and encoding instructions that, when executed in hardware, perform any of the processes describes above. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

In certain embodiments, an apparatus may include circuitry configured to perform any of the processes or functions illustrated above. Circuitry, in one example, may be hardware-only circuit implementations, such as analog and/or digital circuitry. Circuitry, in another example, may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Specific examples of circuitry may be content coding circuitry, content decoding circuitry, processing circuitry, image generation circuitry, data analysis circuitry, or discrete circuitry. The term circuitry may also be, for example, a baseband integrated circuit or processor integrated circuit for a mobile device, a network entity, or a similar integrated circuit in server, a cellular network device, or other computing or network device.

A further aspect relates to a computer program product, stored on a non-transitory memory medium, comprising computer program code, which when executed by at least one processor, causes an apparatus at least to perform: receive requests from a plurality of master nodes to be added as a secondary node as part of a conditional handover process for a user equipment; obtain, from each of said requests, an identification of the user equipment involved in the conditional handover process; and determine, based on said identifications of the user equipment, that a plurality of said requests concern the same user equipment.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising at least one processor and at least one memory, said at least one memory stored with computer program code thereon, the at least one memory and the computer program code configured to, with the at least one processor, cause the apparatus at least to perform:
   receive requests from a plurality of master nodes to be added as a secondary node as part of a conditional handover process for a user equipment;
   obtain, from each of said requests, an identification of the user equipment involved in the conditional handover process, wherein the identification of the user equipment is unique among said master nodes sending requests to be added as a secondary node; and
   determine, based on said identifications of the user equipment, that a plurality of said requests concern the same user equipment.

2. The apparatus according to claim 1, wherein the identification of the user equipment is temporary such that its validity is dependent on a preparation time for the conditional handover process.

3. The apparatus according to claim 1, comprising computer program code configured to cause the apparatus to perform:
   obtain the identification of the user equipment from an Addition Request received from a master node.

4. The apparatus according to claim 3, wherein the identification of the user equipment comprises an identification of a secondary node to a current serving node of the user equipment included in the Addition Request.

5. The apparatus according to claim 4, wherein the identification of the user equipment further comprises an identification of the current serving node of the user equipment included in the Addition Request.

6. The apparatus according to claim 4, wherein the identification of the user equipment comprises a random number, generated by the current serving node of the user equipment or the secondary node to a current serving node of the user equipment, included in the Addition Request.

7. The apparatus according to claim 4, wherein the identification of the user equipment comprises an identification of the current serving node of the user equipment and the identification of the user equipment in the current serving node of the user equipment, both included in the Addition Request.

8. The apparatus according to claim 4, comprising computer program code configured to cause the apparatus to perform:
   obtain, from at least one of said master nodes, a request to release radio resources reserved for the user equipment by the apparatus in response to the master node receiving a conditional handover cancel request from the current serving node of the user equipment.

9. The apparatus according to claim 8, wherein the conditional handover cancel request comprises the temporary identification for the Secondary Cell Group configuration.

10. The apparatus according to claim 1, comprising computer program code configured to cause the apparatus to perform:
   generate a temporary identification for a Secondary Cell Group configuration; and
   include the temporary identification for the Secondary Cell Group configuration in acknowledgement messages to be sent to one or more of said plurality of master nodes.

11. A method comprising:
   receiving, by an access node, requests from a plurality of master nodes to be added as a secondary node as part of a conditional handover process for a user equipment;
   obtaining, from each of said requests, an identification of the user equipment involved in the conditional handover process, wherein the identification of the user equipment is unique among said master nodes; and
   determining, based on said identifications of the user equipment, that a plurality of said requests concern the same user equipment.

12. The method according to claim 11, wherein the identification of the user equipment is temporary such that its validity is dependent on a preparation time for the conditional handover process.

13. The method according to claim 11, wherein the identification of the user equipment is obtained from an Addition Request received from a master node.

14. The method according to claim 13, wherein the identification of the user equipment comprises an identification of a secondary node to a current serving node of the user equipment included in the Addition Request.

15. The method according to claim 14, wherein the identification of the user equipment comprises an identification of the current serving node of the user equipment and the identification of the user equipment in the current serving node of the user equipment, both included in the Addition Request.

16. The method according to claim 14, wherein the identification of the user equipment comprises a random number, generated by the current serving node of the user equipment or the secondary node to a current serving node of the user equipment, included in the Addition Request.

17. The method according to claim 14, comprising obtaining, from at least one of said master nodes, a request to release radio resources reserved for the user equipment by the access node in response to the master node receiving a conditional handover cancel request from the current serving node of the user equipment.

18. The method according to claim 11, comprising generating, by the access node, a temporary identification for a Secondary Cell Group configuration; and including the temporary identification for the Secondary Cell Group configuration in acknowledgement messages to be sent to one or more of said plurality of master nodes.

* * * * *